US012012560B2

(12) United States Patent
Zotin et al.

(10) Patent No.: US 12,012,560 B2
(45) Date of Patent: Jun. 18, 2024

(54) PROCESS FOR PRODUCTION OF AVIATION KEROSENE FROM A STREAM RICH IN AROMATIC COMPOUNDS OF RENEWABLE SOURCE

(71) Applicant: Petróleo Brasileiro S.A.—Petrobras, Rio de Janeiro (BR)

(72) Inventors: Jose Luiz Zotin, Rio de Janeiro (BR); Marcelo Edral Pacheco, Rio de Janeiro (BR); Rodrigo Caetano Chistone, Rio de Janeiro (BR); William Richard Gilbert, Rio de Janeiro (BR); Isa Santos Duarte, Rio de Janeiro (BR); Andrea De Rezende Pinho, Rio de Janeiro (BR); Jefferson Roberto Gomes, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 18/075,886

(22) Filed: Dec. 6, 2022

(65) Prior Publication Data
US 2023/0174874 A1 Jun. 8, 2023

(30) Foreign Application Priority Data
Dec. 7, 2021 (BR) ...................... 10 2021 024746 0

(51) Int. Cl.
*C10G 47/20* (2006.01)

(52) U.S. Cl.
CPC ..... *C10G 47/20* (2013.01); *C10G 2300/1014* (2013.01); *C10G 2300/1018* (2013.01);
(Continued)

(58) Field of Classification Search
CPC .......... B60G 17/015; C10G 2300/1014; C10G 2300/1018; C10G 2300/1033;
(Continued)

(56) References Cited

U.S. PATENT DOCUMENTS

| 4,419,220 A | 12/1983 | Lapierre et al. |
| 4,518,485 A | 5/1985 | Lapierre et al. |

(Continued)

FOREIGN PATENT DOCUMENTS

| BR | PI0500591-4 A2 | 10/2006 |
| BR | 102016003995 A2 | 4/2019 |
| BR | 102020016971 A2 | 3/2022 |

OTHER PUBLICATIONS

Pinho et al. (2017) "Fast Pyrolysis Oil From Pinewood Chips Co-processing With Vacuum Gas Oil in an FCC Unit for Second Generation Fuel Production", Fuel, 188:462-473.
(Continued)

*Primary Examiner* — Ellen M McAvoy
*Assistant Examiner* — Chantel Graham
(74) *Attorney, Agent, or Firm* — Mintz, Levin, Cohn, Ferris, Glovsky and Popeo, P.C.

(57) ABSTRACT

The present invention refers to the processing of a 100% renewable load in FCC units, wherein the load comprises triglycerides of vegetable and animal source, free fatty acids, fatty acid esters, ketones, alcohols and long-chain aldehydes, using catalyst and appropriate operating conditions in order to obtain 100% renewable products with a high content of aromatic compounds, in the range of naphtha, kerosene, diesel and heavy gas oil. The product thus obtained complies with all the properties of the ASTM D1655 standard, even for contents of up to 10% renewable content. In addition, there is no need to reduce the freezing point of the fossil QAV for the introduction of the renewable component, with no impact on the yield and economy of the process.

10 Claims, 1 Drawing Sheet

(52) U.S. Cl.
CPC ............. *C10G 2300/1033* (2013.01); *C10G 2300/4006* (2013.01); *C10G 2300/4012* (2013.01); *C10G 2300/4018* (2013.01); *C10G 2400/08* (2013.01)

(58) Field of Classification Search
CPC .... C10G 2300/4006; C10G 2300/4012; C10G 2300/4018; C10G 2400/08; C10G 3/42; C10G 3/46; C10G 3/49; C10G 3/50; C10G 3/52; C10G 47/20; C10G 69/04; C10L 1/04; Y02P 30/20
See application file for complete search history.

(56) References Cited

U.S. PATENT DOCUMENTS

| | | |
|---|---|---|
| 4,877,581 A | 10/1989 | Chen et al. |
| 4,913,791 A | 4/1990 | Hurd et al. |
| 8,067,657 B2 | 11/2011 | Duarte et al. |
| 11,342,888 B2 | 5/2022 | Lemberg et al. |
| 2022/0403252 A1* | 12/2022 | Vilja .................. C10G 3/50 |

OTHER PUBLICATIONS

Zotin, JL et al. "Produção de QAV com conteúdo renovável por coprocessamento em unidades de HDT de querosene", Rio de Janeiro: PETROBRAS. CENPES. PDRGN. HPE, 2019.

* cited by examiner

PROCESS FOR PRODUCTION OF AVIATION KEROSENE FROM A STREAM RICH IN AROMATIC COMPOUNDS OF RENEWABLE SOURCE

CROSS-REFERENCE TO RELATED APPLICATION

This application claims priority to Brazilian Application No. 10 2021 024746 0, filed on Dec. 7, 2021, and entitled "PROCESS FOR PRODUCTION OF AVIATION KEROSENE FROM A STREAM RICH IN AROMATIC COMPOUNDS OF RENEWABLE SOURCE" the disclosure of which is incorporated herein by reference in its entirety.

FIELD OF INVENTION

The present invention relates to a process for production of aviation fuel with renewable content by co-processing a renewable stream rich in aromatic compounds, derived from the conversion of lipids and fatty acids in a catalytic cracking unit, with fossil or renewable source kerosene, in hydrotreating units for aviation kerosene.

DESCRIPTION OF THE STATE OF THE ART

The production of aviation kerosene (QAV—"querosene de aviação") with renewable content must comply with ASTM D7566 and ASTM D1655 standards regarding approved routes and properties of renewable streams and the final mixture.

The specifications of the fossil QAV are established in the ASTM D1655 standard, among which the freezing point (<−40° C. for Jet-A and <−47° C. for Jet-A1), aromatic content (<26% m), distillation range (T10 ASTM D86<205° C. and PFE ASTM D86<300° C.).

The ASTM D7566 standard establishes the renewable kerosene production routes, the properties of the product obtained in each route and the maximum percentages thereof in mixture with fossil QAV.

The HEFA (Hydroprocessed esters and fatty acids) route comprises the hydrogenation of vegetable oils, fatty acids and animal fats to form paraffinic and isoparaffinic compounds. Among the main specifications that must be met by the BioQAV produced by this route, the very low aromatics content (<0.5% m), the freezing point (<−40° C.) and the limit of 50% volume for addition of the fossil are highlighted. The mixture containing renewable QAV, regardless of the route to obtain the latter, must meet the same specifications as the fossil QAV, that is, the properties indicated in the ASTM D1655 standard, but with some additional specifications, such as the minimum content of aromatics (>8% m), volatility and viscosity.

The ASTM D1655 standard was recently modified and provides the possibility of producing QAV with a renewable content of up to 5% through the co-processing of mono-, di- and triglycerides, free fatty acids and fatty acid esters in the hydrotreatment (HDT) of kerosene, wherein other types of cargo are excluded. Co-processing of these loads must include hydrocracking (HCC) or HDT and fractioning; and may also include other conventional refining processes.

In Brazil, aviation kerosene specifications are regulated by RANP 856/2021 resolutions, which follow ASTM D1655 and ASTM D7566 standards. Also, in Brazil, according to this standard, specifications of −40 (JetA) and −47° C. (JetA1) are accepted for the freezing point. Regarding co-processing, RANP 856/2021 establishes that "the co-processing of conventional feedstock with up to five percent by volume of mono-, di- and triglycerides, free fatty acids and fatty acid esters is allowed", but without mention the refining processes that should or may be involved.

The conversion of alkyl glycerides and fatty acids via the HEFA route leads to the formation of linear paraffins with 15 to 18 carbon atoms when vegetable oils (palm, soy, sunflower, macaúba, etc.) and animal fats are used. These paraffins have a high freezing point (+17 to 28° C.), much higher than the aviation kerosene specification, thus limiting the BioQAV content in the final fuel.

Thus, as the patent document PI0500591-4 teaches, the hydroconversion of oils rich in triglycerides in a mixture with petroleum hydrocarbons, when co-processed in a HDT unit, results in an advantageous alternative that adds quality to the diesel oil produced.

A similar result is evidenced in the patent document U.S. Ser. No. 11/342,888, for the production of hydrocarbons with a boiling point in the diesel range, by co-processing vegetable oils with LCO under hydrotreatment conditions in reactors with catalyst in a fixed bed or fluidized bed.

U.S. Pat. No. 8,067,657 B2 teaches that paraffins with a boiling point in the kerosene range can be obtained by properly selecting the vegetable oils to be processed, but they are oils that have a high market value and are produced in small quantities.

However, these solutions cannot be fully adopted to produce renewable aviation kerosene (bioQAV) due to the kerosene specifications presented in ASTM D7566 and ASTM D1655, mainly with regard to the freezing point and the distillation curve. The n-paraffins formed, containing between 12 and 18 carbon atoms, have a freezing point between −10° C. and 28° C., much higher than that required by the specification, limiting the renewable content in the final fuel to contents below 1% vol.

For this reason, the industrial processes for production of BioQAV by the HEFA route have hydroconversion and/or hydroisomerization steps to, respectively, crack and/or isomerize the n-paraffins formed after the hydrogenation of the renewable load. The product thus obtained undergoes fractioning to obtain bionaphtha, BioQAV and renewable diesel (HVO). The greater the desired proportion of BioQAV in the process, the greater the formation of bionaphtha and the lower the yield of HVO. As previously commented, the BioQAV obtained in this process must meet the ASTM D7566 specification.

To reduce the Freezing Point, U.S. Pat. No. 4,419,220 uses a catalyst containing beta zeolite impregnated with Pt and Pd for isomerization of C10+n-paraffins.

U.S. Pat. No. 4,518,485 uses ZSM-5 and ZSM-20 zeolites impregnated with group VIB and VIIIB metals to reduce the clogging point of a diesel stream.

A process scheme is presented in U.S. Pat. No. 4,913,791, where the diesel stream is treated in a first catalytic bed containing catalysts based on NiMo or CoMo sulfides and a second bed containing hydroisomerization catalyst (beta zeolite).

A catalyst containing SAPO-11 is used in U.S. Pat. No. 4,877,581 for reducing the freezing point of a lubricant stream.

These solutions are not suitable for use in the co-processing of renewable streams in fossil kerosene hydrotreatment units since the catalysts are not suitable for processing oil streams or in view of the undesirable formation of naphtha in parallel with the significant reduction in the freezing point.

In the co-processing of vegetable oils in HDT units, only n-paraffins associated with the type of renewable load are formed, since the conventional HDT catalyst (NiMo or CoMo/alumina) does not have an acid function to crack or isomerize these components. Thus, there can be a major impact on the freezing point.

A study carried out using mixtures of fossil QAV with a freezing point of −61° C. and HVO obtained from soybean oil, with a freezing point of 16.5° C., showed that it is possible to add a maximum of 0.5% vol of HVO maintaining compliance with the QAV-1 specification. A possible alternative would be the use of short-chain vegetable oils (C8 to C14), which generate lower molecular weight n-paraffins during HDT and could, in principle, provide a higher proportion of renewable load. Recent results have shown that the co-processing of palm kernel oil, obtained from the kernel of the palm fruit, allows the use of a maximum of 1% of the renewable load to reach the specification of the freezing point of aviation kerosene (ZOTIN, J L et al. "Produção de QAV com conteúdo renovável por coprocessamento em unidades de HDT de querosene", Rio de Janeiro: PETROBRAS. CENPES. PDRGN. HPE, 2019). These short chain oils still generate an important fraction of C18 paraffins, so the maximum renewable content is limited to 1.0-1.5% in order to meet the freezing point specification in the resulting mixture.

Another important aspect of this approach is the need to reduce the freezing point of the fossil QAV to values below −55° C. to allow the incorporation of low contents of vegetable oil, which implies in loss of yield and production of kerosene in the refinery.

These results show the difficulty of incorporating significant contents of renewable load via co-processing in kerosene HDT units and, mainly, the sensitivity of the QAV freezing point to the presence of n-paraffins formed during the kerosene HDT. An alternative to overcome the problem is the conversion of these n-paraffins to smaller chains, resulting in a reduction in the molecular weight and isomerization of the carbon chains, with a reduction in the freezing point. This conversion is associated with the use of hydroconversion (HCC) or moderate hydroconversion (MHC) catalysts, which require higher severities than those found in kerosene hydrotreatment units. Furthermore, HCC/MHC reactions invariably lead to the formation of light compounds, necessitating a fractioning step, not generally available in kerosene HDT units.

Most approved routes to produce aviation biokerosene (100% renewable) lead to the production of a fuel rich in isoparaffins, which have a lower freezing point compared to homologous paraffins. However, aviation fuel requires, according to the legislation, a minimum content of aromatic compounds in order to maintain compatibility with the elastomeric materials in contact with the fuel. Some routes already consider the formation of aromatics together with isoparaffins. In addition, there is interest from the aviation sector in the use of 100% renewable aviation kerosene, so that the presence of aromatic compounds is desirable in its composition.

The paper of PINHO, A. R. et al. (2017) "Fast pyrolysis oil from pinewood chips co-processing with vacuum gas oil in an FCC unit for second generation fuel production", Fuel, v. 188, p. 462-73, teaches the co-processing of renewable streams such as fast pyrolysis bio-oil with petroleum gas oils, in fluid catalytic cracking (FCC) units. The carbon from the renewable load is distributed among the different products of the process, such as LPG (Liquefied Petroleum Gas), naphtha, diesel and fuel oil. Patent BR 10 2020 016971-8 also teaches the co-processing of triglycerides in FCC units to produce fuels with renewable content.

Therefore, it is possible to directly process biodiesel and vegetable oils in fluid catalytic cracking units (FCC) in the absence of fossil fuel. The absence of hydrogen and the use of suitable zeolitic acid catalysts favor the cracking (chain reduction) and cyclization (aromatic formation) reactions of these renewable loads, concomitantly with the removal of oxygen from the molecules. Streams rich in aromatic compounds in the range of benzene, toluene, xylenes and higher molecular weight alkyl aromatics were obtained, originating from totally renewable loads. One of the fractions, rich in aromatic compounds in C2-benzene (ethylbenzene and xylenes) has a boiling point in the range of kerosene.

No prior art document discloses a production of aviation kerosene with renewable content from co-processing in HDT of a bioaromatic stream obtained by catalytic cracking of biomass such as that of the present invention.

Thus, the present invention was developed to solve the previously described problems associated with the co-processing of triglycerides in the HDT of fossil kerosene and the low content of aromatics in 100% renewable kerosene, through the co-processing of a stream renewable oil rich in aromatic compounds (bioaromatics), with fossil streams or renewable in a hydrotreatment unit, where the bioaromatic stream is obtained by converting vegetable oils, fatty acid esters, including biodiesel, tallow, etc. in a fluid catalytic cracking process under operating conditions and suitable catalysts. This bioaromatic stream has at least 90% aromatic compounds, mostly C2-benzene (ethylbenzene and xylenes). This stream, 100% from renewable sources, has a distillation range and freezing point that, when co-processed with fossil kerosene, does not affect the freezing point of the conventional mixture, the main limitation of the conventional route for co-processing triglycerides in the QAV HDT. The product obtained in the present invention complies with all the specifications of the ASTM D1655 standard, even for contents of up to 10% of renewable content. In addition, there is no need to reduce the freezing point of the fossil QAV for the introduction of the renewable component, with no impact on the yield and economy of the process.

BRIEF DESCRIPTION OF THE INVENTION

The present invention refers to a co-processing process of 100% renewable stream, obtained from the conversion of biodiesel, triglycerides and long-chain fatty acids, containing a high content of aromatic compounds in the range of kerosene, in hydrotreatment units (HDT) of fossil kerosene, in contents up to 10% vol., without the need to reduce the freezing point of the fossil product. The product thus obtained complies with the QAV specifications (Jet A or Jet A-1), with a freezing point below −40° C., according to ASTM D1655 or RANP 856/2021 specification.

The principle of the process is the processing of a load comprising triglycerides of vegetable and animal source, free fatty acids, fatty acid esters, alcohols and long-chain aldehydes in a fluid catalytic cracking unit (FCC) using catalyst and conditions appropriate operations. The obtained product is then fractionated by the usual methods of the oil industry to obtain renewable fractions in the distillation range of naphtha, kerosene, diesel and gasoil containing high contents of aromatic compounds.

The stream in the kerosene distillation range obtained by this process has mostly compounds that can be characterized as alkylbenzenes containing between 6 and 10 carbon atoms. This stream, in the form in which it is generated in the FCC process, alone does not have suitable properties for direct use as aviation kerosene or for mixing with fossil fuel aviation kerosene. According to the present invention, the use of specific catalysts and optimized operating conditions for the processing of renewable feedstock is essential for obtaining streams with a high content of aromatic compounds.

The renewable stream rich in aromatics in the kerosene range can be transformed into aviation kerosene with renewable content by mixing it with a fossil kerosene stream, with a distillation range between 90 and 310° C., more preferably, between 90 and 210° C., in ratio between 0.5 and 30% vol. and subsequent co-processing in a kerosene hydrotreatment unit (HDT), without affecting the freezing point of fossil kerosene.

This approach provides a solution to the problem of increasing the freezing point of kerosene when directly co-processing triglycerides of plant and animal source, free fatty acids, fatty acid esters, alcohols and long-chain aldehydes in units of HDT, which generate high freezing point linear paraffins, limiting the maximum content of the renewable content in the final product. The pre-processing of the renewable stream in FCC units allows obtaining a fraction rich in aromatic compounds that preserves the freezing point of fossil kerosene during co-processing.

The product thus obtained has renewable content between 0.5 and 30% vol. meeting all the required specifications for aviation fuel, in particular the freezing point.

Another approach of the present invention is the co-processing of the bioaromatic stream generated in the FCC process with a 100% renewable load from an oil and fat hydroconversion unit for the production of renewable kerosene and diesel by the HEFA route. The addition of bioaromatic stream to the load of this process provides higher yields of biokerosene and bionaphtha in the process. Due to the presence of aromatics in the biokerosene fraction, this product has properties that allow it to be used as a 100% renewable fuel in the aeronautical sector.

BRIEF DESCRIPTION OF DRAWINGS

The present invention will be described in more detail below, with reference to the attached figures which, in a schematic and not limiting of the inventive scope, represent examples of its realization. The drawings show.

DETAILED DESCRIPTION OF THE INVENTION

Figure 1:
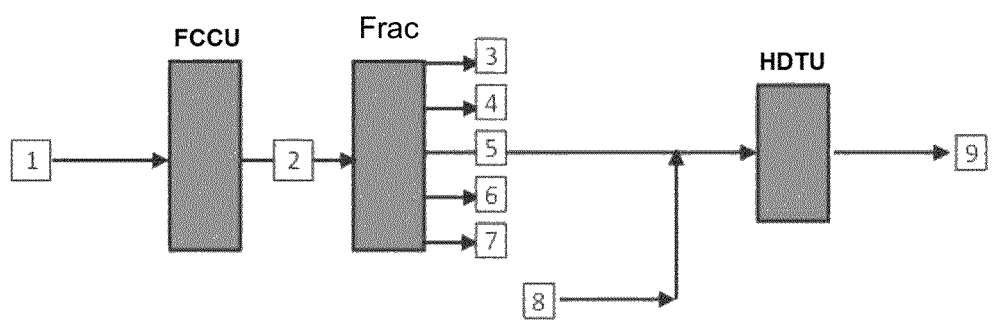
FIG. 1 illustrating a scheme for obtaining the bioaromatic fraction in the kerosene distillation range and its co-processing in a fossil kerosene HDT unit. The load (1), consisting of vegetable oil, animal fats, free fatty acids, fatty acid esters, higher alcohols and aldehydes and bio-oil from pyrolysis of residual biomass, pure or combined, is admitted to a fluid catalytic cracking unit (FCCU), under suitable process and catalyst conditions, where it is mostly converted into hydrocarbons, water, CO, CO2 and where the hydrocarbon fraction contains high contents of aromatic compounds, particularly alkyl-aromatics. The FCCU product (2) is sent to the fractioning unit (Frac) where it is separated into renewable products according to the distillation range, into LPG (3), naphtha (4), kerosene (5), diesel/LCO (6) and heavy gas oil (7). The bioaromatic fraction in the kerosene range (5), having a distillation range and properties suitable for use in aviation kerosene, is mixed with kerosene of fossil source (8) in a variable proportion between 0.5 and 20% and admitted into a kerosene hydrotreatment unit (HDTU) where the mixture is processed to remove contaminants such as sulfur, nitrogen, oxygen and olefinic compounds. In this step, all product properties (9) are specified to meet the specification of aviation kerosene according to ASTM D1655. This product (9) contains fossil and renewable hydrocarbons in its composition.
Figure 2:
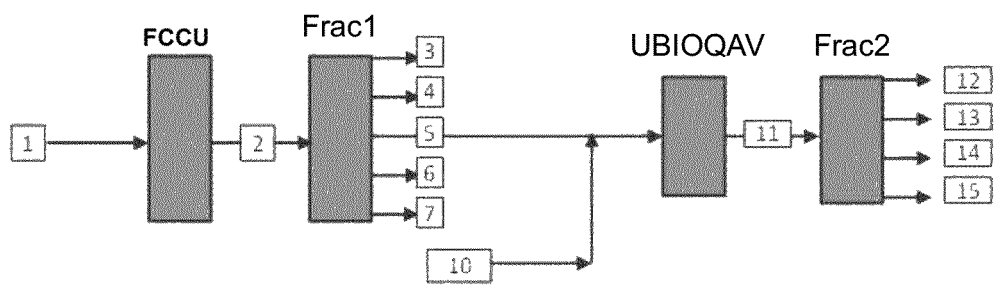
FIG. 2 illustrating a schematic of the aromatic fraction co-processing in a biofuel production unit (UBIOQAV) The load (1), consisting of vegetable oil, animal fats, free fatty acids, fatty acid esters, higher alcohols and aldehydes and bio-oil from pyrolysis of residual biomass, pure or combined, is admitted to a fluid catalytic cracking unit (FCCU), under suitable process and catalyst conditions, where it is mostly converted into hydrocarbons, water, CO, CO2 and where the hydrocarbon fraction contains high contents of aromatic compounds, particularly alkyl-aromatics. The FCCU product (2) is sent to the fractioning unit (Frac1) where it is separated into renewable products according to the distillation range, into LPG (3), naphtha (4), kerosene (5), diesel/LCO (6) and heavy gas oil (7). The bioaromatic fraction in the kerosene range (5), having distillation range and properties suitable for use in aviation kerosene, is mixed with a 100% renewable load, comprising vegetable oil, animal fats, free fatty acids, fatty acid esters, higher alcohols and aldehydes and bio-oil from pyrolysis of residual biomass, pure or combined, in a proportion between 0.5 and 20% and admitted in a biofuel production unit, for example, using the HEFA (Hydrogenation of Esters of Fatty Acids) route, which includes hydrogenation and hydroconversion steps. In this unit, hydrogenation reactions take place in the presence of hydrogen and a suitable catalyst, which transform the oxygenated compounds present in the load into hydrocarbons, water, CO and CO2. This unit can optionally contain a hydroconversion section to modify the distillation range and cold flow properties of the hydrocarbon stream. The liquid product of this process step (11) is sent to a second fractioning step (Frac2) where the renewable fractions of LPG (12), naphtha (13), kerosene (14) and diesel (15) are separated. The kerosene fraction (14) has (iso) paraffinic and aromatic compounds in its composition, with suitable properties for use as renewable aviation fuel. The other fractions may or may not contain aromatic compounds from the bioaromatic stream (5), depending on the distillation ranges established in the Frac2 unit.

The catalytic processes of oil refining aim to transform the hydrocarbons present in oil into suitable compounds for the formulation of final products, such as fuels, petrochemical inputs and others.

The fluid catalytic cracking (FCC) process aims converting heavy petroleum fractions in the range of diesel and vacuum residues into molecules distributed over a wide range of carbon atoms number, obtaining streams in the range of liquefied petroleum gas (LPG), naphtha or gasoline, kerosene, diesel and fuel oil. The process is carried out in the presence of specific catalysts, typically comprising microcrystalline materials or zeolites, binders, alumina and promoter metals. Different types of zeolites can be used in this process, wherein the most common types are FAU and MFI.

The co-processing of renewable streams in the FCC is known in the technical literature, enabling the production of fuels with renewable content. Fast pyrolysis bio-oil co-processing of residual lignocellulosic materials is presented in patent application BR102016003995-9, for bio-oil contents between 0 and 30%. The renewable carbon is distributed in all fractions of the process, that is, residual gas, LPG, naphtha, light recycled oil (LCO) and heavy recycled oil (HCO), in addition to the coke deposited in the catalyst and burned in the regenerator. In this step, part of the renewable carbon is used to generate energy for the process itself, being emitted as CO2, which contributes to the reduction of greenhouse gas (GHG) emissions of fossil source in refining operations. The co-processing of triglycerides with diesel fuel of fossil source in FCC units is also known (Patent BR 10 2020 016971-8), which also leads to the formation of products containing mostly compounds of fossil source and a fraction of compounds of renewable source, according to the renewable load content processed and the yields of each process product. The fractions obtained in the FCC process, whether or not containing co-processing renewable content, are not suitable for the direct production of aviation kerosene as they have very high content of aromatics and olefins, which are not properly corrected in subsequent refining processes.

The present invention provides the processing of a 100% renewable load in FCC units, a load comprising triglycerides of plant and animal source, free fatty acids, fatty acid esters, ketones, alcohols and long-chain aldehydes, using a catalyst and appropriate operational conditions in order to obtain 100% renewable products with a high content of aromatic compounds, in the range of naphtha, kerosene, diesel and heavy gas oil. A preferred process approach comprises the processing of vegetable oils, including vegetable oils such as soybean, sunflower, palm, cotton, cited as examples but not limited to these species. In another preferred approach, the processing of virgin or animal fats, or used as beef tallow, such as, poultry, porcine, fish or seaweed fat, is used. Another preferred approach considers the processing of streams rich or pure in fatty acids containing between 10 and 22 carbon atoms, as well as the respective methyl or ethyl esters. The use of a cracking catalyst containing one or more small diameter zeolites (MFI or equivalent) is important for obtaining high contents of aromatic compounds, suitable for the purpose of this invention, as opposed to catalysts containing medium and large pore zeolites, or mesoporous zeolites that favor the formation of olefinic and paraffinic compounds, not suitable for the object of this invention.

The products thus obtained, with a high aromatic content, are fractionated according to the distillation range and their application in fuel mixtures, such as gasoline, kerosene, diesel or renewable fuel oil, or they can be selectively fractionated to obtain streams rich in compounds of interest for petrochemical application, such as benzene, toluene, xylenes, para-xylene, ethylbenzene, and similar compounds, or solvents for application in the chemical industry.

The fraction obtained in the 100% renewable FCC process contains compounds in the kerosene distillation range, between 90 and 310° C., preferably between 90 and 210° C., containing compounds with 7 to 14 carbon atoms, preferably between 7 and 10 carbon atoms, wherein they are mostly of aromatic structure, preferably alkyl aromatic. This renewable stream, with a high content of aromatic compounds, is mixed with a stream of fossil source, distilled from petroleum or derived from petroleum refining in cracking, delayed coking or hydrocracking processes, with a distillation range between 90 and 310° C., preferably between 130 and 260° C. This mixed load is co-processed in hydrotreatment units, in the presence of hydrogen and a suitable catalyst, generating a hydrogenated product that meets the properties of aviation kerosene in accordance with ASTM 01655. In particular, the stream containing renewable components of an aromatic nature maintains the freezing point of the final mixture below the specification value (<−40° C.), for contents up to 10% of renewable content.

This approach allows the production of aviation kerosene with renewable content up to 10% and specified freezing point, by co-processing in HDT units. It also has the advantage of higher contents of renewable content in aviation kerosene by co-processing, compared to the co-processing of oils and fats in kerosene HDT, which is generally limited to 0.5-1% vol.

The process for producing sustainable aviation kerosene is carried out from streams rich in aromatic compounds from renewable sources, through co-processing of mixed loads of fossil kerosene and renewable streams, where the renewable stream is rich in aromatic compounds and is obtained by converting oils vegetable, animal fats and/or fatty acid esters in a fluid catalytic cracking unit. This mixture is homogenized and fed into an HDT reactor in the presence of high-pressure hydrogen and NiMo sulfide catalyst supported on alumina, at a pressure of 40 to 45 bar, temperature between 300 and 330° C. and space velocity of 3.5 to 4.0 $h^{-1}$. The mixed load can contain from 0 to 10% vol of bioaromatic stream diluted in fossil kerosene.

Another approach of this invention consists of combining aromatic streams generated in the FCC with selective catalyst and 100% renewable load, containing triglycerides, free fatty acids, fatty acid esters, ketones, alcohols and long-chain aldehydes, with the process of producing biokerosene aviation fuel and renewable diesel via the HEFA (hydrogenation of esters of fatty acids) route. The HEFA route produces a paraffinic biokerosene practically free of aromatic compounds (<0.5% according to ASTM D7566). Because they contain a high paraffin content, these compounds need to be transformed into isoparaffins to reduce the freezing point (−40° C. according to ASTM D7566) through hydroconversion and hydrodewaxing processes. This biokerosene must be added to fossil kerosene in a ratio up to 50% vol., to meet, in the final mixture, a minimum aromatics content of 8% (required by ASTM D1655). According to the present invention, the fraction rich in aromatics obtained in the FCC of 100% renewable load containing triglycerides, free fatty acids, fatty acid esters, ketones, alcohols and long-chain aldehydes with selective catalyst, wherein this fraction has a distillation range between 30 and 450° C., preferably between 50 and 350° C., is mixed and co-processed with the triglycerides and fatty acids load in a hydrogenation unit of the HEFA route, obtaining a product that contains in its composition, the original paraffins and isoparaffins from the HEFA process and the aromatics from the aromatic stream from the FCC process. This approach allows obtaining 100% renewable biokerosene, with a composition above 8% of aromatics required by the ASTM D1655 standard, without the need to add fossil fuel. The presence of aromatic compounds in the HEFA unit load also favors obtaining products with a lower freezing point, with less severity in the hydroconversion and hydroisomerization steps and a higher yield of renewable aviation kerosene.

The present invention discloses a process for producing sustainable aviation kerosene from a stream rich in aromatic compounds from a renewable source to produce 100% renewable aviation biokerosene by co-processing a mixed feed containing renewable diesel, vegetable oil and a bioaromatic stream. This mixture is homogenized and fed into a hydroconversion reactor in the presence of high-pressure hydrogen and a catalytic system comprising 50 to 70% vol of hydrogenation catalyst and 30 to 50% vol of hydroconversion catalyst, at a pressure of 40 to 43 bar, temperature from 330 to 350° C. and space velocity from 1.5 to 2.5 $h^{-1}$.

The mixed charge can contain from 60 to 70% m of renewable diesel, 20 to 30% m of vegetable oil and 0 to 10% m of bioaromatics.

The hydrogenation catalysts can be selected from NiMo, CoMo, NiW or Mo sulfides supported on alumina, modified alumina, silica or silica-aluminas and the hydroconversion catalysts are based on prepared NiMo, NiW, Ni, Pt, Pd, PtPd with supports containing zeolite Y, Beta, ZSM-5, ZSM-22, SAPO-11, among others.

EXAMPLES

The following examples are presented in order to more fully illustrate the nature of the present invention and the way to practice the same, without, however, being considered as limiting its content.

Example 1: Fossil Kerosene, FCC Renewable Aromatic Stream, Soybean Oil and Palm Kernel Oil A stream of kerosene was used as fossil feed, which fractioning was previously adjusted to obtain a freezing point lower than the ASTM 01655 standard specification (−59.7° C.). The properties of this stream are shown in Table 2, along with the properties of the hydrogenated products.

The bioaromatic stream was generated in a prototype FCC unit, through the processing of a soybean oil methyl ester stream, using a selective catalyst for conversion of renewable load and formation of aromatic compounds, according to the patent application BR102020016971-8. The product was distilled and the fraction with a distillation range between 90 and 160° C. was used for the tests of the present invention. The properties of this stream are shown in Table 1.

TABLE 1

Composition of the bioaromatic stream.

| Group | % m | Arom. compound | % m | Melting point ° C. | Boiling point ° C. |
|---|---|---|---|---|---|
| Alkanes | 1.92 | BENZENE | 0.04 | 15.5 | 80.1 |
| Alkenes | 1.58 | TOLUENE | 13.42 | −93 | 110.6 |
| Dienos | 1.09 | Ethylbenzene | 20.19 | −95 | 136 |
| Naphthenics | 2.73 | m-XYLENE | 0.99 | −48 | 139 |
| olefin | 1.98 | p-XYLENE | 54.37 | 13 | 138 |

TABLE 1-continued

Composition of the bioaromatic stream.

| Group | % m | Arom. compound | % m | Melting point ° C. | Boiling point ° C. |
|---|---|---|---|---|---|
| naphthenics | | o-XYLENE | 1.17 | −24 | 144 |
| Diolefin aphthenics | 0.03 | Isopropyl benzene | 0.01 | −96 | 152 |
| Aromatics | 90.19 | | | | |
| Total | 100 | | 90.19 | | |

For comparative purposes of the co-processing tests, refined soybean oil, essentially containing fatty acids with 16 and 18 carbon atoms, and palm kernel oil (palm nut oil), containing essentially fatty acids with 12 and 14 carbon atoms, were used.

Example 2: Bioaromatic Stream Co-Processing with Fossil Kerosene

Mixtures containing from 0 to 10% vol of bioaromatic stream diluted in fossil kerosene were prepared. These mixtures were homogenized and fed into a reactor, at high partial pressure of hydrogen and NiMo sulfide catalyst supported on alumina, according to the operating conditions shown in Table 2.

TABLE 2

Properties of the loads and hydrogenated products.

| | QAV (*) Bioaromatic | | Test 1 | Test 2 | Test 3 | Test 4 |
|---|---|---|---|---|---|---|
| Bioaromatic content (% vol.) | | | 0 | 2 | 5 | 10 |
| T (*C) | | | 310 | 310 | 310 | 310 |
| P (bar, g) | | | 43 | 43 | 43 | 43 |
| LHSV(h-1) | | | 3.7 | 3.7 | 3.7 | 3.7 |
| H2/HC (NL/L) | | | 110 | 110 | 110 | 110 |
| Analysis | | | | | | |
| Density | 0.7935 | 0.8497 | 0.7917 | 0.7927 | 0.7941 | 0.7963 |
| Sulfur (mg/kg) | 784 | <1 | 12 | 8 | 10 | 16 |
| Freezing Point (*C) | −59.7 | −16.5 | −58.0 | −59.5 | −60.0 | −61.0 |
| Hydrocarbon Distribution | (% m) | | | | | |
| Saturated | 82.8 | 4.3 | 83.6 | 82 | 80.1 | 77.1 |
| Olefins | 0.1 | 8.4 | 0.1 | 0.1 | 0.1 | 0.1 |
| Total aromatics | 17.1 | 87.3 | 16.3 | 17.9 | 19.8 | 22.8 |

High removal of sulfur compounds was obtained in all evaluated compositions. Fossil kerosene has a freezing point of −59.7° C. and has an end point of 265° C. (ASTM 02887). Hydrotreating does not significantly change the freezing point of kerosene (−58° C. for the T1 test). The addition of the bioaromatics stream also does not impact this property and, even with the addition of 10% of this stream in the load, the freezing point value remains similar to that of the original load (−61° C. for the test T4). This behavior is different from the co-processing of vegetable oils which, as previously mentioned, promotes a sharp increase in the freezing point, restricting the addition to low contents of renewable component (0.5% in the case of soybean oil), as compared in Table 3. This is probably associated with the high content of aromatic compounds in the bioaromatic stream, which has a lower freezing point and molecular mass than the n-paraffins generated in the conversion of vegetable oil into HDT.

TABLE 3

Comparison of the freezing point variation with the renewable load content during co-processing in the HDT, for bioaromatic stream, soybean oil and palm kernel oil.

| | Freezing point (° C.) | | |
|---|---|---|---|
| Renewable Load Content (% vol.) | Fossil QAV + soy oil | Fossil QAV + palm kernel oil | Fossil QAV + Bioaromatic |
| 0 | −59 | −59 | −59 |
| 1 | −37 | | |
| 2 | −30 | −40 | −60 |
| 5 | −21 | −38 | −60 |
| 10 | | | −62 |

The distillation curves of loads and hydrotreated products are shown in Table 4. Most of the bioaromatic sample distills between 130 and 150° C., corresponding to the distillation of the C2-benzene compounds present in the load. The distillation curve of the mixture containing bioxylene has a small inflection (~10° C.) between 10 and 40% of distillates, associated with the presence of the aromatic stream rich in p-xylene. There is no significant change in the distillation profile after hydrotreatment.

The original kerosene stream contains 17.1% m total aromatics. With the introduction of 10% of the bioxylene stream, this value reached 22.8%, below the 26.5% specification of ASTM 01655. As expected, the increment occurs in the monoaromatic content, since the renewable stream comprises essentially xylenes, ethylbenzene and toluene.

1H and 13C NMR measurements indicated the absence of residual oxygenated compounds, eventually still present in the bioaromatic stream.

TABLE 4

Product distillation curve

| Distillation (% m) | Bio-Aromatic ° C. | Prod Fossil QAV HDT ° C. | Prod HDT QAV + Bioaromatic ° C. |
|---|---|---|---|
| 0.5 | 98.6 | 90.8 | 90.8 |
| 2 | 111 | 115.6 | 110 |
| 5 | 112.4 | 126.2 | 120.6 |
| 10 | 113.8 | 136.8 | 134 |
| 30 | 140 | 164 | 154.6 |
| 50 | 143.6 | 184.6 | 179 |
| 70 | 146 | 207 | 201.8 |
| 90 | 147.8 | 232 | 230.4 |
| 95 | 148.2 | 239.6 | 237.8 |
| 99.5 | 157.6 | 264.4 | 264 |

Example 3: Bioaromatic Stream Co-Processing with Vegetable Oil in HEFA Biokerosene Unit A mixture containing 60% m of renewable diesel (HVO, mixture of n-paraffins between C15 and C18), 30% m of soybean oil and 10% m of bioaromatic fraction was prepared. This mixture was homogenized and fed into a reactor in the presence of high hydrogen pressure and a catalytic system comprising NiMo sulfide catalyst supported on alumina (HDT—60% vol) and NiMo/alumina-zeolite Y sulfide catalyst (HCC—40% vol), at a pressure of 43 bar, temperature of 330° C. and space velocity of 2 h$^{-1}$. The addition of renewable diesel to the load has the function of diluting the vegetable oil and the bioaromatic fraction, to regulate the high exothermicity of the vegetable oil conversion reactions and the associated hydrogen consumption. A control experiment was performed with a load containing 70% HVO and 30% soybean oil.

Under these operational conditions, the vegetable oil is transformed into the HDT catalyst in n-paraffins containing between 15 and 18 carbon atoms. Subsequently, these n-paraffins are cracked and isomerized in the HCC catalyst forming paraffinic and isoparaffinic compounds containing between 3 and 18 carbon atoms. The unsaturations (olefins) present in the bioaromatic stream are hydrogenated in the HDT catalyst, however the monoaromatic compounds present in this stream are preserved throughout the process due to the relatively mild operating conditions.

The test effluent was fractionated into the various products, with the yields and properties are shown in Table 5.

TABLE 5

Yields and properties of products obtained by co-processing stream with bioaromatics and vegetable oil in a HDT.

| Load | | | Product | | | | |
|---|---|---|---|---|---|---|---|
| Component | % m | Fraction | Yield % m | Density 20/4*C | Freezing Point (*C) | Aromatics % m | Paraffins % m |
| HVO | 70 | BIOGLP | 2 | | | | |
| Vegetable Oil | 30 | BIONAFTA | 8 | 0.752 | | 0.5 | 99.5 |
| BIOAROMATIC | 0 | BIOQAV | 35 | 0.761 | −43 | 0.5 | 99.5 |
| | | HVO | 65 | 0.783 | | 0.5 | 99.5 |
| HVO | 60 | BIOGLP | 2 | | | | |
| Vegetable Oil | 30 | BIONAFTA | 10 | 0.765 | | 28 | 72 |
| BIOAROMATIC | 10 | BIOQAV | 39 | 0.776 | −42 | 17 | 83 |
| | | HVO | 49 | 0.781 | | 0.5 | 99.5 |

In the control experiment containing only vegetable oil in the load, essentially paraffinic compounds are formed in all fractions, with a BioQAV yield of approximately 35% and a freezing point of −43° C. In the co-processing of the bioaromatic fraction with soybean oil, part of the aromatic compounds present in the bioaromatic fraction was transferred to the Bionaphtha fraction (distillation <130° C.) and the remainder was distilled into the BioQAV fraction. The BioQAV fraction has an aromatic content of 17% and the BioNafta fraction contains 28% m, while the diesel fraction remains essentially paraffinic. This aromatics content is compatible with the aromatics content range of aviation kerosene of fossil source (between 8 and 26.5%). BioQAV freezing point does not change significantly and remains below the required specification (<−40° C.) These properties allow to envision the application of the BioQAV obtained in the present invention in the ratio up to 100%, without the need for addition to kerosene of fossil source, as currently required for the paraffinic product obtained by the conventional process of hydrogenation of oils and fats (HEFA route) which limits the addition of BioQAV to 50%.

Another advantage of this approach is that the bionaphtha thus obtained has better combustion properties (octane) than the bionaphtha from the HEFA route due to the aromatic compounds derived from the bioaromatic fraction added to the load.

It should be noted that, although the present invention has been described in relation to the attached drawings, it may undergo modifications and adaptations by technicians versed in the subject, depending on the specific situation, but provided that it is within the inventive scope defined herein.

The invention claimed is:

1. A method to produce an aviation mixture, the method comprising:
   receiving a renewable stream rich in comprising aromatic compounds of a renewable source, wherein the renewable stream comprises aromatic compounds and is obtained by converting vegetable oils, animal fats and/or fatty acid esters in a fluid catalytic cracking unit;
   receiving a stream of fossil kerosene;
   mixing the stream of fossil kerosene and the renewable stream to produce a mixed load;
   homogenizing and feeding the mixed load into a reactor in a presence of hydrogen and NiMo sulfide catalyst supported on alumina, at a pressure of 40 to 45 bar, at a temperature between 300 and 330° C., and a space velocity of 3.5 to 4.0 to thereby produce the aviation mixture, the aviation mixture comprising at least 8% aromatics.

2. The method according to claim 1, wherein homogenizing and feeding the mixed load is carried out in conventional hydrotreatment (HDT) units.

3. The method according to claim 1, wherein the mixed load contains from 0 to 10% vol of bioaromatic stream diluted in fossil kerosene.

4. The method according to claim 1, wherein the vegetable oils comprise virgin or used vegetable oils chosen from soybean oil, sunflower oil, palm oil, cotton oil, macaúba oil, and corn oil.

5. The method according to claim 1, wherein the animal fats are chosen from beef tallow, poultry, porcine, fish, or seaweed fat.

6. A method for production of an aviation mixture, the method comprising:
   receiving a renewable stream comprising bioaromatic compounds of renewable sourced;
   receiving a renewable diesel stream;
   receiving a vegetable oil stream;
   mixing the renewable stream, the renewable diesel stream, and the vegetable oil stream to produce a mixed load;
   homogenizing and feeding the mixture into a reactor comprising a system catalyst comprising hydrogenation and hydroconversion catalysts, at a pressure of 40 to 43 bar, at a temperature of 330 to 350° C., and a space velocity of 1.5 to 2.5 h-1 to thereby, produce the aviation mixture, the aviation mixture comprising at least 8% aromatics.

7. The method according to claim 6, wherein the mixed load contains 60 to 70% m of renewable diesel, 20 to 30% m of vegetable oil and 0 to 10% m of bioaromatics.

8. The method according to claim 6, wherein the system catalyst comprises 50 to 70% vol of hydrogenation catalyst and 30 to 50% vol of hydroconversion catalyst.

9. The method according to claim 8, wherein the hydrogenation catalysts comprise NiMo, CoMo, NiW, or Mo sulfides supported on alumina, modified alumina, silick or silica aluminas and the hydroconversion catalysts are based on NiMo, NiW, Ni, Pt, Pd, or PtPd prepared with supports containing zeolite Y, Beta, ZSM-5, ZSM-22, or SAPO-11.

10. The method according to claim 9, wherein the system catalyst comprises 60% vol of sulfide NiMo catalyst supported on alumina and 40% vol of sulfide NiMo/alumina catalyst-zeolite Y.

* * * * *